(12) United States Patent
Zagorski et al.

(10) Patent No.: US 11,014,333 B2
(45) Date of Patent: May 25, 2021

(54) METHOD AND SYSTEM FOR REINFORCED PIPE INSULATION

(71) Applicant: Rilco Manufacturing Company, Inc., Houston, TX (US)

(72) Inventors: Kenneth L. Zagorski, Houston, TX (US); Joseph A. Donoghue, Houston, TX (US); Mike Bock, Houston, TX (US)

(73) Assignee: Rilco Manufacturing Company, Inc., Houston, TX (US)

( * ) Notice: Subject to any disclaimer, the term of this patent is extended or adjusted under 35 U.S.C. 154(b) by 0 days.

(21) Appl. No.: 16/286,724

(22) Filed: Feb. 27, 2019

(65) Prior Publication Data
US 2019/0184677 A1    Jun. 20, 2019

Related U.S. Application Data

(63) Continuation of application No. 13/406,561, filed on Feb. 28, 2012, now Pat. No. 10,252,490.
(Continued)

(51) Int. Cl.
*B32B 7/00* (2019.01)
*B29C 37/00* (2006.01)
(Continued)

(52) U.S. Cl.
CPC ............ *B32B 7/12* (2013.01); *B29C 37/0085* (2013.01); *B32B 1/08* (2013.01); *B32B 3/08* (2013.01);
(Continued)

(58) Field of Classification Search
CPC ........... Y10T 428/24322; Y10T 428/24; B29C 37/0085; B29C 70/443; B32B 3/266; B32B 37/12
See application file for complete search history.

(56) References Cited

U.S. PATENT DOCUMENTS 2,808,338 A * 10/1957 Bruno .................... C04B 28/24
                                                        252/62
3,216,167 A * 11/1965 Roberts .................. E04C 2/284
                                                        52/612
(Continued)

FOREIGN PATENT DOCUMENTS

| DE | 2731729 A1 * | 2/1979 | ............ F16L 59/026 |
| JP | 54-174965 | 12/1979 | |
| JP | 01-269527 | 10/1989 | |

OTHER PUBLICATIONS

Machine translation into English of DE2731729 to Armbrust published Feb. 1, 1979—6 pages. (Year: 1979).*

*Primary Examiner* — Linda L Gray
(74) *Attorney, Agent, or Firm* — The Petruzzi Law Firm; James D. Petruzzi

(57) ABSTRACT

A method for assembling a reinforced non-compressible pipe support by inserting a plurality of generally cylindrical holes in a first sheet of insulation in a pre-determined pattern, inserting a similar group of holes in at least a second sheet of insulation so that the holes of both sheets line up when the first sheet is placed against a pre-determined cylindrical or flat form and the second sheet is placed on top of the first sheet thereby forming contiguous voids where mating holes are positioned adjacent each other, applying a pressurized flowable material to fill each void along its longitudinal axis, and curing the material until it forms a hardened material thereby forming the plurality of sheets into a non-compressible arcuate body having an inner radius of curvature that fits against a pipe or into a rectilinear block. Multiples sheets may be adhered and thermoplastic or resin used to fuse them together.

20 Claims, 8 Drawing Sheets

Related U.S. Application Data

(60) Provisional application No. 61/508,865, filed on Jul. 18, 2011.

(51) Int. Cl.
  *B32B 1/00* (2006.01)
  *B32B 3/00* (2006.01)
  *B32B 7/12* (2006.01)
  *F16L 59/02* (2006.01)
  *F16L 59/135* (2006.01)
  *B32B 1/08* (2006.01)
  *B32B 3/08* (2006.01)
  *B32B 3/26* (2006.01)

(52) U.S. Cl.
  CPC ............ *B32B 3/266* (2013.01); *F16L 59/024* (2013.01); *F16L 59/029* (2013.01); *F16L 59/135* (2013.01); *B32B 2597/00* (2013.01); *Y10T 428/24298* (2015.01); *Y10T 428/24322* (2015.01)

(56) References Cited

U.S. PATENT DOCUMENTS

| | | | | |
|---|---|---|---|---|
| 4,087,501 | A | * | 5/1978 | Moser ............... B29C 33/00 138/149 |
| 4,287,245 | A | * | 9/1981 | Kikuchi ............ F16L 59/024 138/141 |
| 4,576,206 | A | * | 3/1986 | Lauren .............. B32B 1/08 138/149 |
| 2006/0263587 | A1 | * | 11/2006 | Ou ................. B32B 27/283 428/292.1 |
| 2007/0154698 | A1 | * | 7/2007 | Stepanian .............. B32B 5/26 428/294.7 |

\* cited by examiner

Figure 3
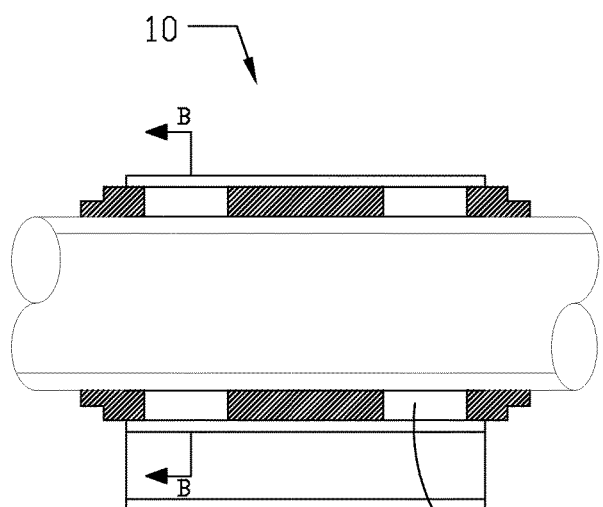
Figure 4
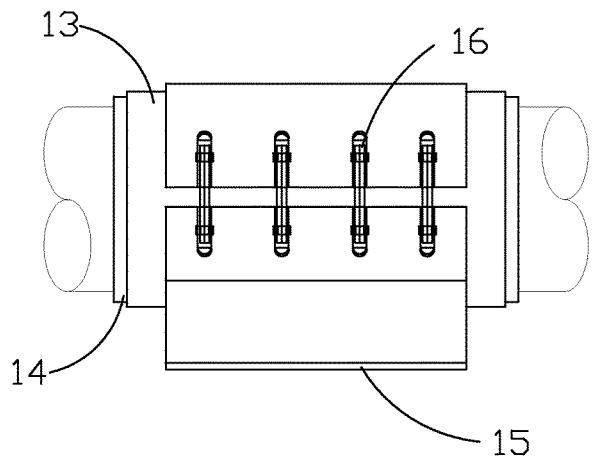
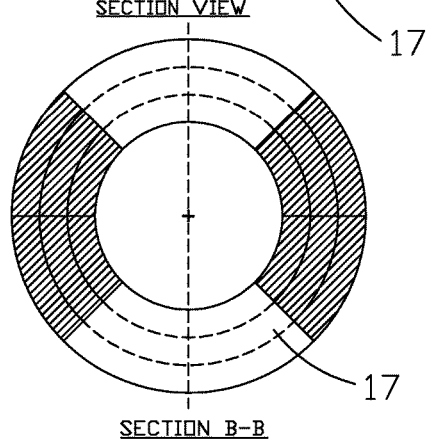
Figure 5

Figure 6
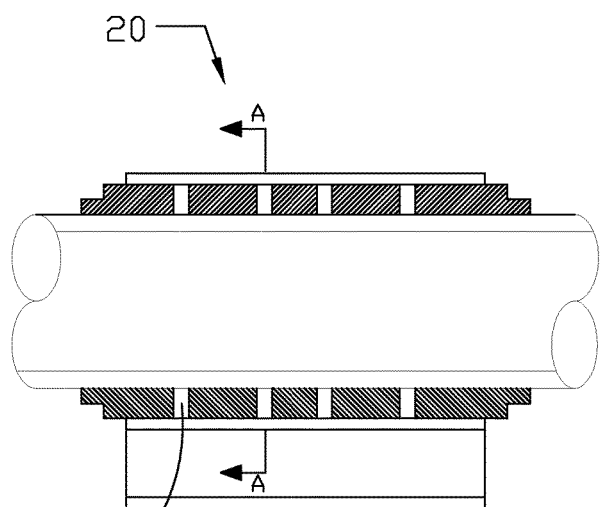
Figure 7
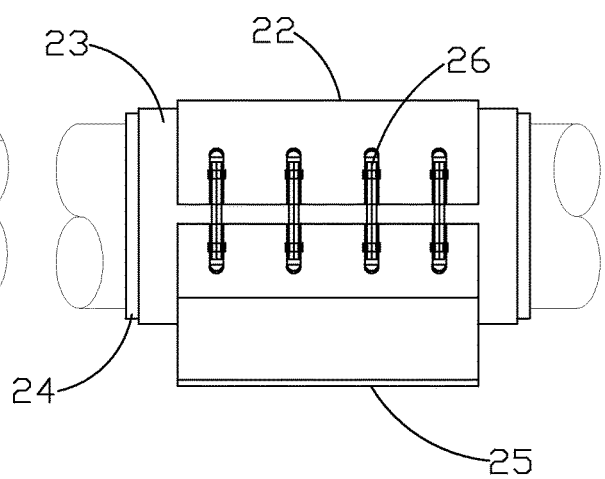
SECTION VIEW
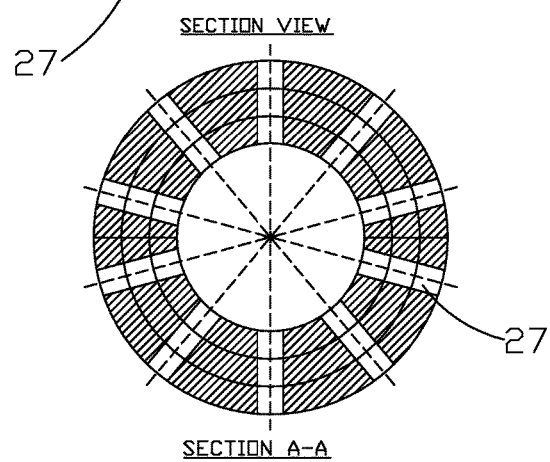
SECTION A-A
Figure 8

SECTION A-A

SECTION C-C

PRIOR ART

METHOD AND SYSTEM FOR REINFORCED PIPE INSULATION

CROSS REFERENCE TO RELATED APPLICATIONS

This application is a continuation of patent application Ser. No. 13/406,561, filed on Feb. 28, 2012, which is based on provisional application Ser. No. 61/508,865, filed on Jul. 18, 2011 which is incorporated as if fully set forth herein.

STATEMENT REGARDING FEDERALLY SPONSORED RESEARCH OR DEVELOPMENT

Not Applicable

DESCRIPTION OF ATTACHED APPENDIX

Not Applicable

FIELD OF THE INVENTION

This Invention relates to insulated pipes and tank bases. In particular this invention relates to a method and system for insulating pipes with flexible reinforced material as well as the insulation of tank bases.

BACKGROUND OF THE INVENTION

Currently, pipe and other conduit used in various industrial applications including refineries are insulated by wrapping insulation in a continuous overlapping pattern. When the insulation approaches the location near where the pipe is supported, it must be stopped and restarted before and after the pipe support to maintain the load bearing characteristics of the pipe support. In this region where the pipe is supported, the wrapped insulation is positioned about the pipe in increased diameters of insulation to provide adequate insulation and maintain the proper load bearing characteristics. This is wasteful and creates areas of compromised insulation prone to thermal leakage and breaking of the insulation due to movement of the pipes caused by stresses placed on the pipe due to fluids or gases moving through the pipe. There thus exists a need to configure flexible insulation material in a manner to withstand compressive forces while maintaining a low profile about a pipe or other longitudinal member. In addition current methods of insulating tank bases require the use of very thick insulation that increases the overall height of a given tank. The use of the new insulation material reduces the tank height thus saving significantly on the materials required to build the tank.

In accordance with a preferred embodiment of the invention, there is shown a reinforced insulation material having one or more sheets of insulation material having a plurality of voids in each sheet, wherein the sheets are operably connected to each other in a layered configuration, the voids on each sheet are oriented in a mating pattern that generally forms cylindrical regions on the layered configuration, and a synthetic material inserted into the voids of each sheet to connect the sheets to each other.

In accordance with a preferred embodiment of the invention, there is shown a reinforced insulation material having a plurality of sandwiched sheets of insulation material, each sheet having a plurality of voids, the voids on each sheet oriented in a mating pattern to the voids on the other sheets to form cylindrical voids when connected together and a synthetic material inserted into the voids of each sheet to connect the sheets.

In accordance with a preferred embodiment of the invention, there is shown a reinforced insulation material having one or more sheets of insulation material having a void in each sheet, wherein the sheets are operably connected to each other, the void on each sheet oriented in a mating pattern to the void on said other sheets to form a three dimensional void when connected together, and a synthetic material inserted into the voids of each sheet to connect the sheets.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 3 shows a cross sectional view of a pipe insulation assembly and pipe according to a preferred embodiment of the invention.

FIG. 4 shows a side view of a pipe insulation assembly and pipe according to a preferred embodiment of the invention.

FIG. 5 shows a cross section along lines B-B of FIG. 3.

FIG. 6 shows a cross sectional view of a pipe insulation assembly and pipe according to a preferred embodiment of the invention.

FIG. 7 shows a side view of a pipe insulation assembly and pipe according to a preferred embodiment of the invention.

FIG. 8 shows a cross section along lines A-A of FIG. 6.

DETAILED DESCRIPTION OF THE PREFERRED EMBODIMENTS

Figure 1:
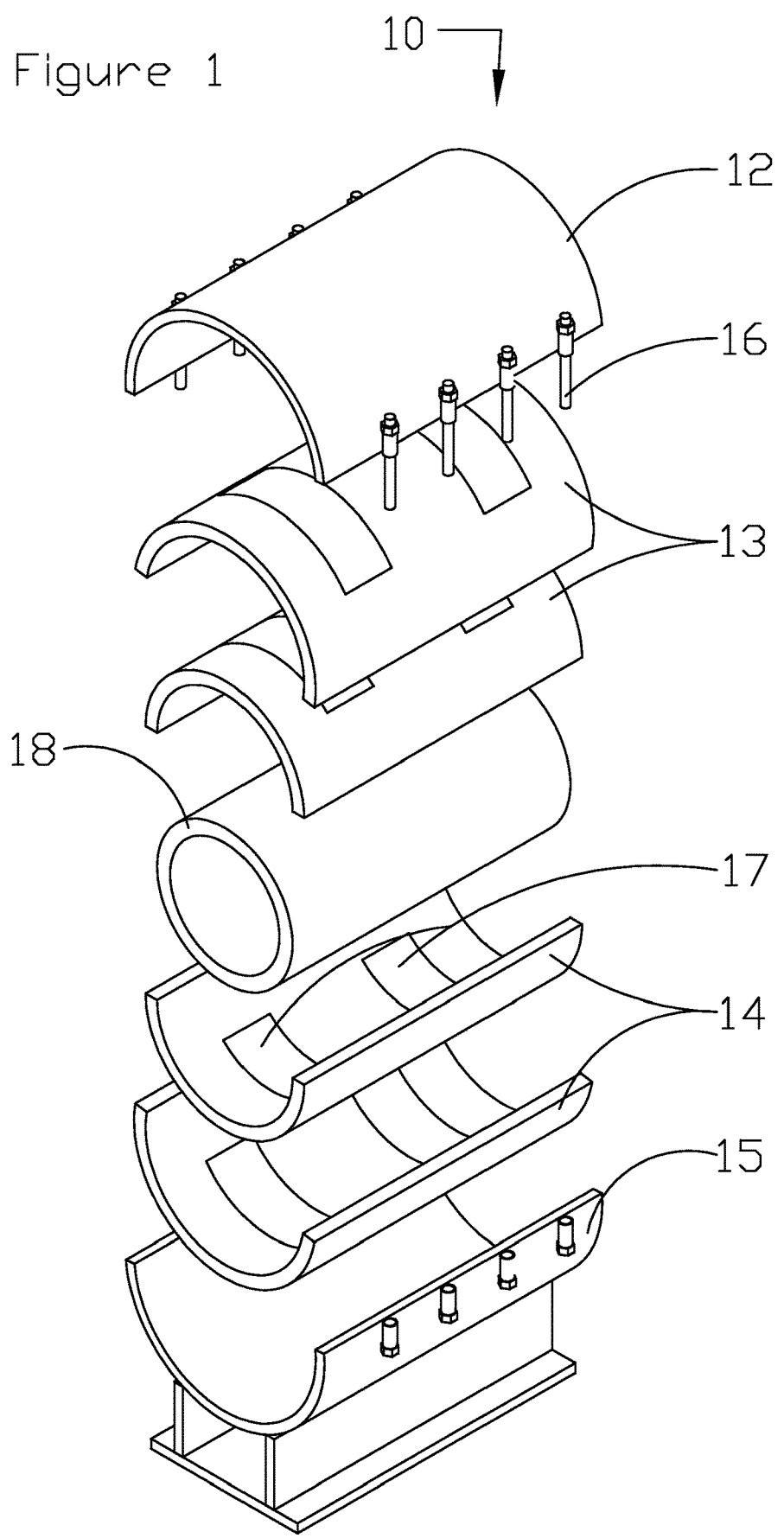
FIG. 1 shows an exploded view of a pipe insulation assembly according to a preferred embodiment of the invention.

Turning now to FIG. 1, there is shown an exploded view of a pipe support and insulation assembly according to a preferred embodiment of the invention.

Bottom cradle 15 is a conventional pipe cradle having a semicircular configuration for the reception of a cylindrical pipe 18. Cylindrical pipe 18 must be insulated while at the same time the insulation must be able to withstand the loads and stresses that are applied to the pipe at the support location.

Insulation upper sheets 13 and insulation lower sheets 14 are configured in semicircular pieces to fit around cylindrical pipe 18. The insulation upper sheets 13 and insulation lower sheets 14 are shown as two separate sheets but may be of any of a number of sheets depending on the application. Insulation upper sheets 13 and insulation lower sheets 14 are configured with a pattern of rectilinear voids or block stiffeners 17 as to permit stiffener material to be inserted into insulation upper sheets 13 or insulation lower sheets 14 to be stacked while still maintaining a longitudinal rectangle of space through the series of sheets. As more fully described below, the rectangular spaces may be filled with stiffener which may be comprised of a variety of materials as described below. Once insulation upper sheets 13 are stacked and suitable stiffening material is added, the insulation upper sheets 13 form a rigid semicircular member that goes around the outer diameter of half of cylindrical pipe 18.

An insulation composite consisting of a flexible sheet type insulation with structural insulation inserts of the present invention solves these problems. The flexible sheet type insulation, while vastly superior to other insulations with regards to thermal performance, has very low design compressive strength values. This renders the flexible sheet type insulation poorly suited for situations which require the insulator to resist compressive forces. In order to increase the flexible sheet type insulation's compressive strength values, structural inserts must be placed in the insulation.

Figure 2:
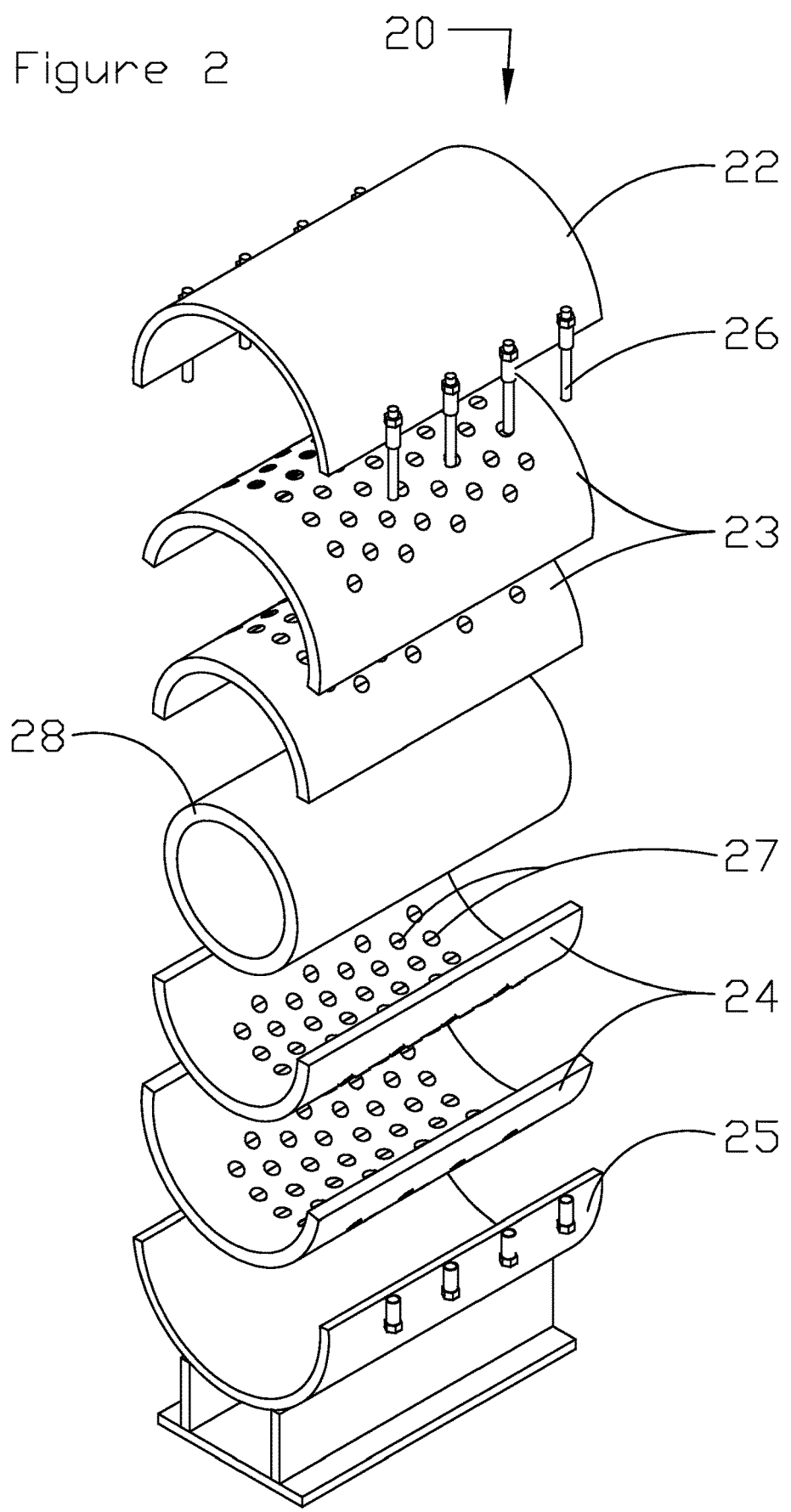
FIG. 2 shows an exploded view of a pipe insulation assembly according to another preferred embodiment of the invention.

Turning now to FIG. 2, there is shown an exploded view of a pipe support and insulation assembly according to another preferred embodiment of the invention. Insulation upper sheets 23 and insulation lower sheets 24 are configured in semicircular pieces to fit around cylindrical pipe 28. The insulation upper sheets 23 and insulation lower sheets 24 are shown as two separate sheets but may be of any of a number of sheets depending on the application. Insulation upper sheets 23 and insulation lower sheets 24 are configured with a pattern of holes as more fully shown in FIGS. 5 and 9 to permit the mating sheets on insulation upper sheets 23 or insulation lower sheets 24 to be stacked while still maintaining a longitudinal cylinder of space through the series of sheets. As more fully described below, the cylindrical spaces may be filled with stiffener which may be comprised of a variety of materials as described below. Once insulation upper sheets 23 are stacked and suitable stiffening material is added, the insulation upper sheets 23 form a rigid semicircular member that goes around the outer diameter of half of cylindrical pipe 28.

Turning to FIG. 1, the two semicircles of insulating material are fixedly attached about cylindrical pipe 18 by top cradle 12 and bottom cradle 15 via bolts 16. Any number of mechanisms may be used to connect top cradle 12 and bottom cradle 15 such as clamps, ties or other means. Further, top cradle 12 and bottom cradle 15 may be of a clamshell configuration with a hinged side and have bolts or other fixation mechanism to connect the opposing side. Once configured, the insulation upper sheets 13 and insulation lower sheets 14 form an impermeable thermal layer about cylindrical pipe 18 at the point of contact with top cradle 12 and bottom cradle 15. By using layers of insulation, such as aerogel based insulation layers, thin layers of highly thermal insulation may be configured into a stiff internal shell about cylindrical pipe 18 for affixation in top cradle 12 and bottom cradle 15. One commercially available such insulation is sold under the trademark, Cryogel®. This stiffening of the insulation as more fully described below, creates an insulating layer that is both thermally sound and capable of handling the loads applied to the pipe during operation.

Similarly, lower insulation sheets 14 are configured for reception of stiffener and once constructed may be placed about the lower half of cylindrical pipe 18.

As shown in FIG. 2, the two semicircles of insulating material are fixedly attached about cylindrical pipe 28 by top cradle 22 and bottom cradle 25 via bolts 26. Any number of mechanisms may be used to connect top cradles 22 and bottom cradle 25 such as clamps, ties or other means. Further, top cradle 22 and bottom cradle 25 may be of a clamshell configuration with a hinged side and have bolts or other fixation mechanism to connect the opposing side. Once configured, the insulation upper sheets 23 and insulation lower sheets 24 form an impermeable thermal layer about cylindrical pipe 28 at the point of contact with top cradle 22 and bottom cradle 25. By using layers of insulation, such as aerogel based insulation layers, thin layers of highly thermal insulation may be configured into a stiff internal shell about cylindrical pipe 28 for affixation in top cradle 22 and bottom cradle 25. This stiffening of the insulation as more fully described below, creates an insulating layer that is both thermally sound and capable of handling the loads applied to the pipe during operation.

The inserts can be mated with the flexible insulation using several different methods as noted above. The most cost effective methods appear to be either injecting polyurethane foam into cavities cut into the flexible sheet type insulation, which expands and hardens during the curing process, naturally bonding to the flexible insulation or creating structural shapes and then gluing the inserts into the cavities.

Top cradle 22 and bottom cradle 25 are bolted together with bolts 26 to form a rigid insulating covering to cylindrical pipe 28.

The flexible sheet type insulation with structural inserts can be manufactured into different shapes. The two most common shapes being the constant radius arc (pipe covering) and a flat block. The inserts' density and spacing between one another is load dependent. The higher the load, the spacing between the inserts should be decreased or the density should be increased or a combination of both. The ideal composite configuration has the lowest density inserts with the greatest amount of space between one another in order to minimize the negative impact on the overall thermal performance.

FIG. 3 shows a side view of a pipe and insulation assembly with block stiffeners 17 positioned in the insulation.

FIG. 4 shows a side elevational view of insulations upper sheets 13 and insulation lower sheets 14 positioned about the pipe and set in bottom cradle 15 that is secured with bolts 16.

FIG. 5 shows a cross sectional view of a completed series of sheets with block stiffeners 17 positioned in the rectilinear voids previously described. As is readily apparent, the individual sheets have different sizes of voids to accommodate the increased diameter as each sheet is placed one on top of the other. This results in a greater amount of stiffener material in the outer sheet than the inner sheet.

Turning to FIG. 6, a second embodiment is shown in cross sectional view of a completed series of sheets with block stiffeners 27 positioned in the cylindrical voids previously described. As is readily apparent, the individual sheets have cylindrical voids in different positions so that when positioned together they create a single cylindrical tube in which stiffener material may be added. Thus, each sheet of insulation material preferably has a pattern of holes drilled or cut in the material. Each sheet of material has a similar pattern of holes configured in such a way as to create cylindrical tubes when two or more sheets are stacked together. As is readily apparent, to configure a series of sheets that conform to a cylindrical pipe, the hole pattern on each sheet has to be successively done in a wider spaced pattern for the outer sheets as compared to the inner sheets. This allows for the increased diameter of the sheet material that progresses from the inner sheet to the outer sheet in a stack.

FIG. 7 shows a side elevational view of insulation upper sheets 23 and insulation lower sheers 24 wrapped around a pipe, secured by top cradle 22 and bottom cradle 25 via bolts 26.

FIG. 8 shows a longitudinal cross sectional view along A-A of FIG. 6 having a series of sheets and block stiffeners 27 affixed about the pipe.

Figure 9:
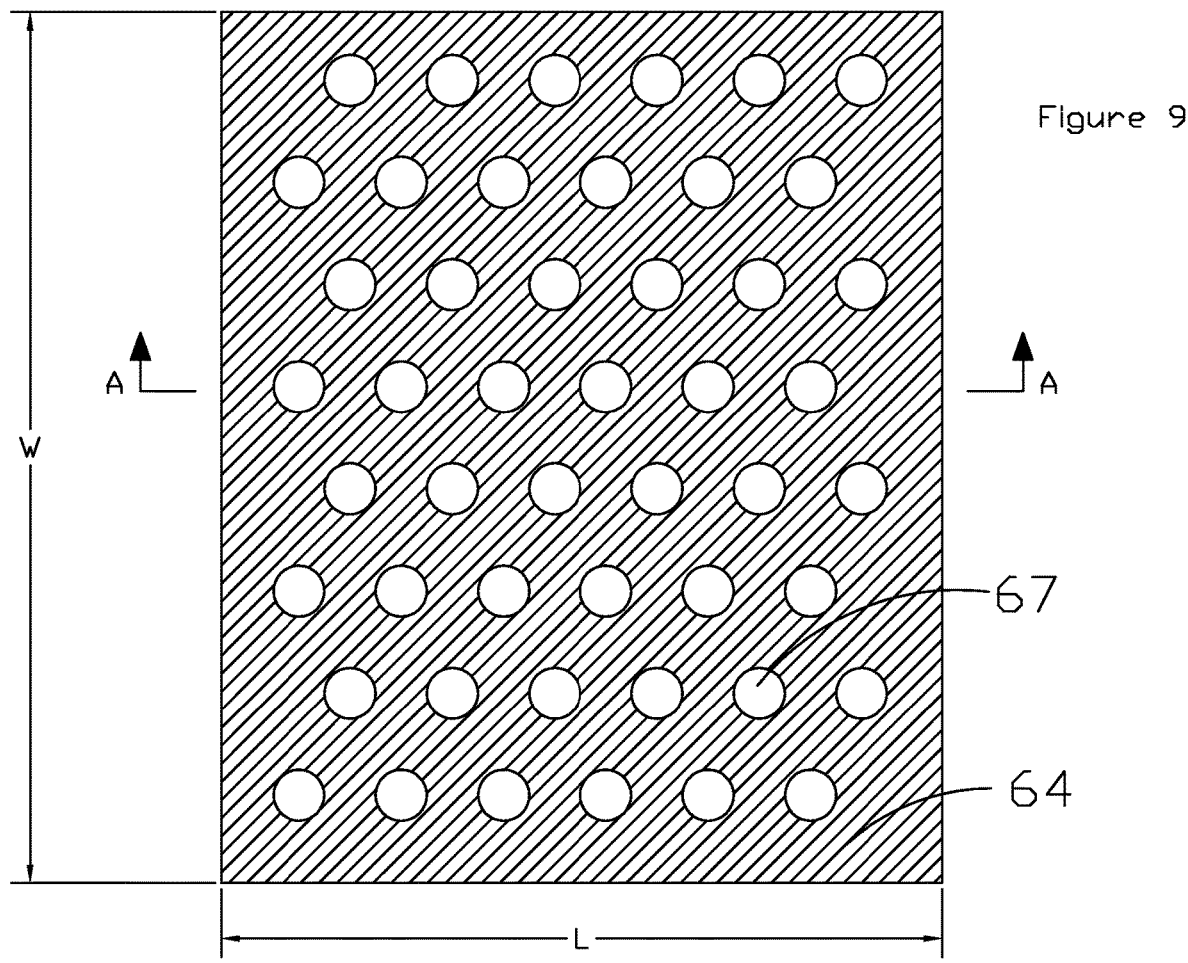
FIG. 9 shows a plan view of a section of insulation and hole pattern according to a preferred embodiment of the invention.

Thus, the hole pattern may be varied in a group of sheets to be honeycombed, rectilinear or offset as shown in FIG. 9, but each successive sheet will be slightly different in spacing to accommodate the changed radius of curvature for that sheet's location in the stack.

Figure 10:
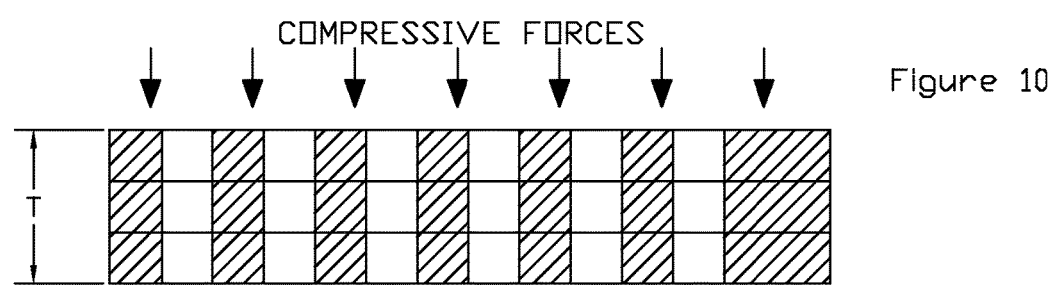
FIG. 10 shows a side cross sectional view of a series of sandwiched insulation sheets along the lines A-A of FIG. 9 according to a preferred embodiment of the invention.

FIG. 10 shows a side cross sectional view along A-A of FIG. 9 of a flat block embodiment where the insulation material is configured in a rectilinear block for placement under a structure needing insulation below it. The stiffener material is inserted into the cylindrical tube created by the series of holes in each successive layer to create a strong semi-rigid block that can withstand downward compressive forces as shown. In alternative embodiments where a flat or substantially flat reinforced insulation is needed, the hole pattern may be substantially the same from sheet to sheet so as to line up in cylindrical voids when placed in a stack of two or more sheets of insulation.

The hole pattern may be varied depending on the surface load of the pipe line or the tank being supported. When more strength is needed, the hole pattern may be more dense than in other situations requiring lesser strength. FIG. 9 shows a hole pattern that is honeycombed in configuration, but any of a variety of sizes or patterns may be employed and still accomplish the preferred result.

Figure 11:
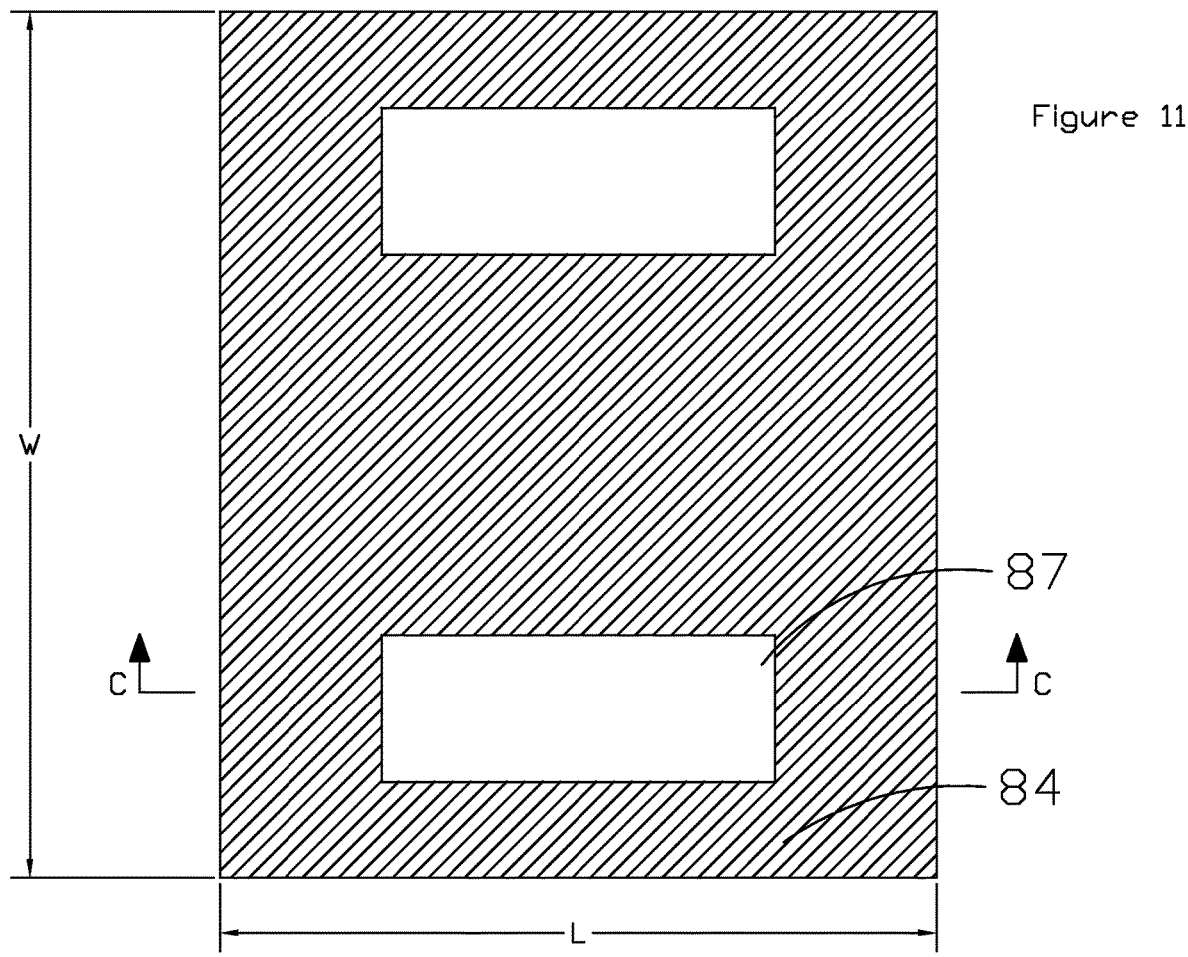
FIG. 11 shows a plan view of a section of insulation and hole pattern according to a preferred embodiment of the invention.

FIG. 11 shows a plan view of a sheet having a rectilinear or block void 87 in insulation material 84. A series of similar sheets may be stacked for either a circumferential configuration around a pipe or stacked in a single block for use under a tank.

Figure 12:
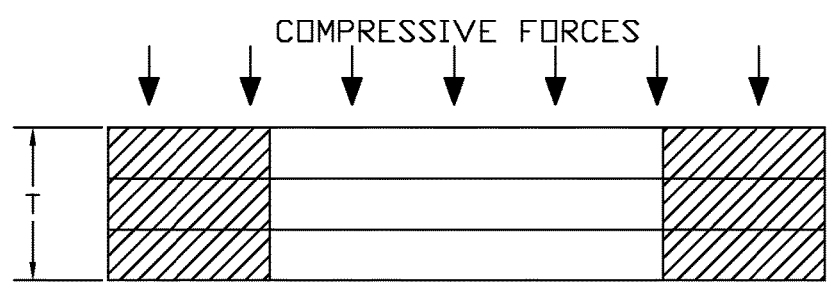
FIG. 12 shows a side cross sectional view of a series of sandwiched insulation sheets along the lines C-C of FIG. 11 according to a preferred embodiment of the invention.

As shown in FIG. 12, which is a side cross sectional view along C-C of FIG. 11, the fully assembled group of sheets has a solid block of stiffener material disposed within the block the create a single piece resistant to downward compressive forces as shown. The stiffener material is inserted into the cylindrical tube created by the series of holes in each successive layer to create a strong semi-rigid block that can withstand downward compressive forces as shown. In alternative embodiments where a flat or substantially flat reinforced insulation is needed, the hole pattern may be substantially the same from sheet to sheet so as to line up in cylindrical voids when placed in a stack of two or more sheets of insulation. As is readily apparent, to configure a series of sheets that conform to a cylindrical pipe, the hole pattern on each sheet has to be successively done in a wider spaced pattern for the outer sheets as compared to the inner sheets. This allows for the increased diameter of the sheet material that progresses from the inner sheet to the outer sheet in a stack. Thus, the hole pattern may be varied in a group of sheets to be honeycombed, rectilinear or offset as shown in FIG. 9, but each successive sheet will be slightly different in spacing to accommodate the changed radius of curvature for that sheet's location in the stack. In alternative embodiments where a flat or substantially flat reinforced insulation is needed, the hole pattern may be substantially the same from sheet to sheet so as to line up in cylindrical voids when placed in a stack of two or more sheets of insulation.

Figure 13:
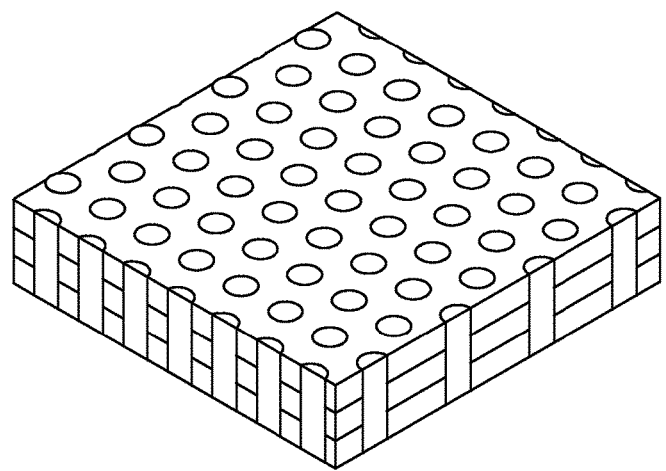
FIG. 13 shows a perspective view of three sandwiched insulation sheets having a hole pattern according to a preferred embodiment of the invention.

FIG. 13 shows a perspective view of a series of sheets that have been drilled with cylindrical holes for placement of reinforcing material. Once the material is applied, the insulation sheets form a stiff box with dowel like supports throughout the composite material.

Figure 14:
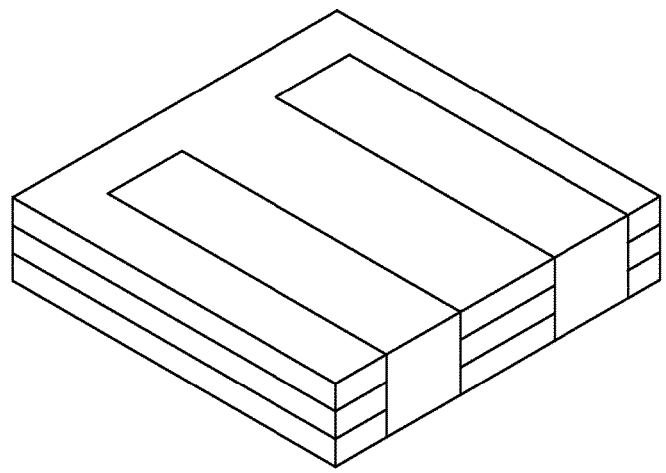
FIG. 14 shows a perspective view of three sandwiched insulation sheets having a reinforced patter according to a preferred embodiment of the invention.

FIG. 14 shows a similar effect with the block voids that run through the series of sheets.

Figure 15:
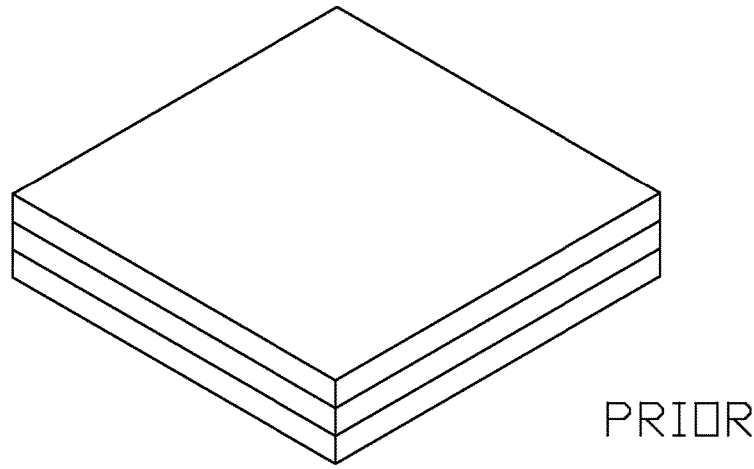
FIG. 15 shows three sandwiched insulation sheets according the prior art.

FIG. 15 shows prior art with simply a group of sheets piled onto each other. The prior art has the disadvantage of the sheets lacking any reinforcing quality and typically large numbers of sheets are required to achieve a similar insulating quality as those of the present invention.

Figure 16:
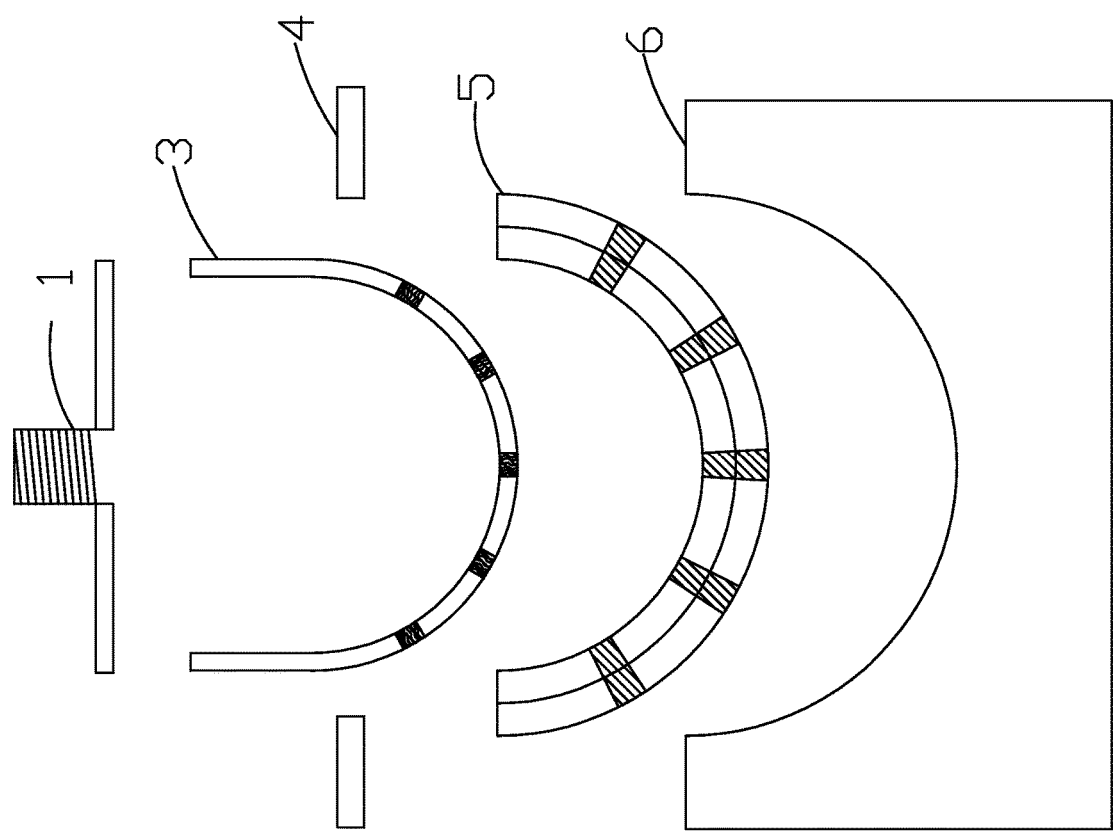
FIG. 16A shows a side cross sectional view of a mold that may be used in producing reinforced insulation according to a preferred embodiment of the invention.
FIG. 16B shows an exploded view of FIG. 16A.
Figure 16:
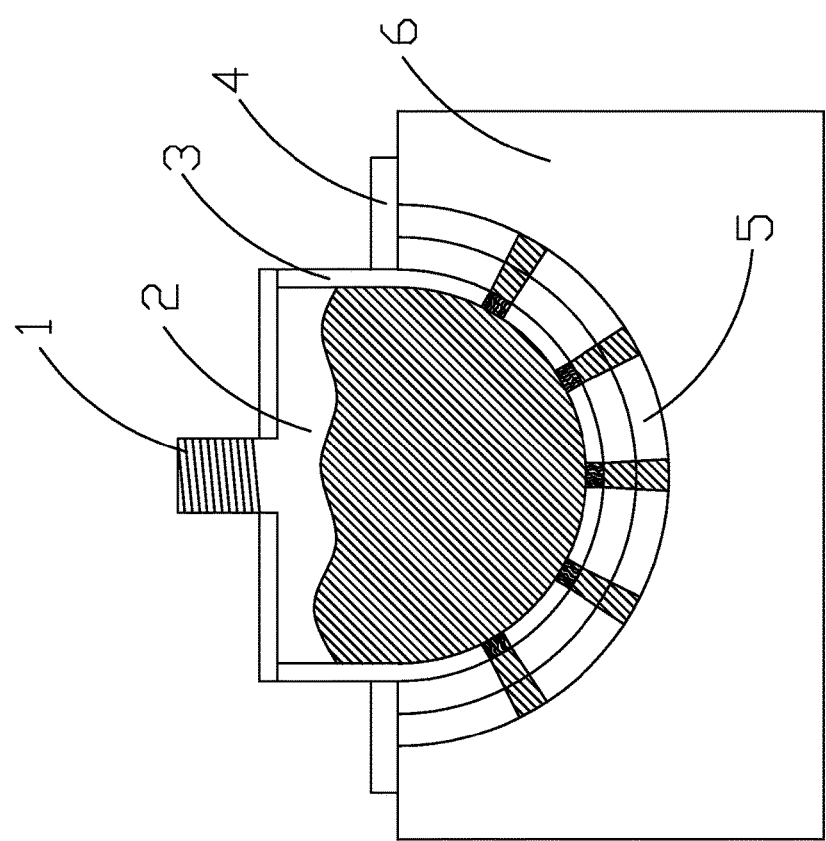

Turning now to FIGS. 16A and 16B, there is shown a cross sectional view of a mold used to form one half of the cylindrical group of sheets that might be positioned about a pipe. Base 6 has a semicircular receptacle that is shaped to fit the outer diameter of the completed group of sheets. Successive sheets are positioned on top of each other on the mold in such a fashion as to line up the holes to form cylindrical tubes. This requires as previously noted for each successive sheet to have a slightly different hole pattern to fit the smaller radius presented at each level of the insulation assembly. Once the sheets are in place on the mold, a mating injector block 3 is placed over the inside layer of insulation with ports lined up for each cylindrical tube. Reinforcing material 2 is placed inside the injector block 3 and pressurized through input port 1 so that reinforcing material 2 is pushed into the various holes in the insulation. The insulation sheets are blocked off by end stops 4 so that reinforcing material is maintained within the sandwiched sheets.

As can be readily appreciated, reinforcing material may flow between the sheets in some preferred instances further reinforcing the sheets and adhering them to each other. FIG. 16B shows an exploded view of the injection mold apparatus.

Once the hole or block pattern is created in the group of sheets that form one of the two semicircular insulation assemblies or other shapes, stiffeners must be added to the group of sheets to create the desired rigidity. The stiffener may be of any of a variety of materials, but preferably, it is an injection of resin into the cylindrical tubes that, once hardened, creates the structural integrity required. The resin may be of any of a variety of thermoplastic or adhesive type flowable material so long as it fills in the cylindrical voids in the pattern of holes for the group of sheets.

In a preferred embodiment, thermoplastic or other resin is injected into a mold that is configured to hold the upper group of sheets or lower group of sheets for the desired diameter of pipe. Once the sheets are aligned and placed in the mold, plastic, resin or other suitable hardening material is injected into the mold and fills the cylindrical voids.

Additionally, it is preferred to inject sufficient material to not only fill the cylindrical voids but to flow material between the sheets for added rigidity. By doing this, a series of hardened rods or cylinders are created transverse to the plane of the sheets as well as material between and on the surface of each sheet that then forms a portion of the curved configuration of the assembled sheets.

When fully injected and hardened, the several sheets have a series of radial stiffener spokes perpendicular to the outer diameter of the subject pipe, and a group of semicircular stiff sheets between each of the insulation sheets. This creates a very strong insulating layer as shown in FIGS. 10 and 12 capable of withstanding increased compressive forces applied across the insulation layers when positioned in the cradles about the pipe.

In alternative embodiments, the stiffeners could be individual rigid members such as pegs or dowels made of any of a variety of materials. Each cylindrical void would be filled with one or more such pegs or dowels to create a reinforced group of sheets. The pegs or dowels could be affixed with glues, thermoplastic or other adhesives placed around the pegs or dowels.

The invention claimed is:

1. A method for assembling a reinforced non-compressible pipe support comprising the steps of:
   a. inserting a plurality of generally cylindrical holes in a first sheet of insulation in a pre-determined pattern;
   b. inserting a plurality of generally cylindrical holes in a second sheet of insulation of the same material as the first sheet in a mating pre-determined pattern offset so that the holes in the second sheet line LIE with the holes of the first sheet when the first sheet is placed against a partial cylindrical form and the second sheet is placed on top of the first sheet thereby forming contiguous extended voids in each location where mating holes are positioned adjacent each other;
   c. placing the first sheet against a partial cylindrical form and the second sheet against the first sheet;
   d. applying a flowable resin under pressure to enter and fill each said hole along their longitudinal axis; and
   e. curing the resin until it forms a hardened material fusing the first and second sheets into a non-compressible arcuate body having an inner radial surface that fits against a section of the circumference of a pipe having a particular outer diameter.

2. A method as claimed in claim 1 for assembling a reinforced non-compressible pipe support further comprising the steps of inserting a third sheet of insulation with a mating pre-determined pattern of holes offset sufficiently so that the holes in the third sheet line up with the holes of the second sheet when the third sheet is placed against the second sheet thereby forming contiguous cylindrical voids in each location where mating holes are positioned adjacent each other on each of said sheets.

3. A method as claimed in claim 1 for assembling a reinforced non-compressible pipe support further comprising an end block on the cylindrical form adjacent at least one outer side edge of the sheets.

4. A method as claimed in claim 1 for assembling a reinforced non-compressible pipe support further comprising the step of covering the outer surface of the support with a sheet of different material than the insulation of the first and second sheets.

5. A method as claimed in claim 1 for assembling a reinforced non-compressible pipe support further comprising the step of injecting resin into each said void.

6. A method as claimed in claim 1 for assembling a reinforced non-compressible pipe support further comprising the step of forming the sheets in a semi-circular shape.

7. A method as claimed in claim 1 for assembling a reinforced non-compressible pipe support wherein the insulation sheets are comprised of aerogel.

8. A method for assembling a reinforced non-compressible pipe support comprising the steps of:
   a. forming a plurality of generally cylindrical holes in a first sheet of insulation in a row and column pattern at least having 6 columns and 6 rows;
   b. forming a plurality of generally cylindrical holes in a second sheet of insulation spaced apart where the holes in the second sheet line up with the holes of the first sheet when the first sheet is curved against a cylindrical form and the second sheet is placed adjacent the first sheet thereby forming contiguous cylindrical voids in each location where mating holes are positioned adjacent each other;
   c. placing the first sheet against a partial cylindrical form and the second sheet against the first sheet;
   d. applying a flowable resin under pressure to enter and fill each of said holes along their longitudinal axis; and
   e. curing the resin until it forms a hardened material thereby forming the first and second sheets into a non-compressible arcuate half cylindrical body having an inner radius of curvature that fits against a pipe.

9. A method as claimed in claim 8 for assembling a reinforced non-compressible pipe support further comprising the step of covering an outer radius of the arcuate half cylindrical body with a sheet of different material than the insulation of the first and second sheets.

10. A method as claimed in claim 8 for assembling a reinforced non-compressible pipe support wherein the resin is a thermoplastic.

11. A method as claimed in claim 8 for assembling a reinforced non-compressible pipe support wherein the insulation sheets are comprised of aerogel.

12. A method as claimed in claim 8 for assembling a reinforced non-compressible pipe support further comprising the step of placing a mating injector block having a void that engages a surface of one of the sheets.

13. A method as claimed in claim 12 for assembling a reinforced non-compressible pipe support further comprising the steps of forcing the resin through the injector block void into the holes of the sheet engaged with the mating injector block.

14. A method as claimed in claim 8 for assembling a reinforced non-compressible pipe support further comprising the steps of having an end block placed on an edge of one of the sheets.

15. A method for assembling a reinforced non-compressible pipe support comprising the steps of:
   a. forming a plurality of generally cylindrical holes in a first sheet of insulation in a row and column pattern;
   b. forming a plurality of generally cylindrical holes in a second sheet of insulation in a pattern spaced apart where the holes in the second sheet line up with the holes of the first sheet when the first sheet is placed against a curved partial circular form and the second sheet is placed adjacent the first sheet thereby forming contiguous cylindrical voids in each location where mating holes are positioned adjacent each other;
   c. placing the first sheet against a partial cylindrical form and the second sheet against the first sheet;

d. applying a flowable material under pressure to enter and fill each said hole along its longitudinal axis; and e. solidifying the material until it forms a hardened rod in cylindrical void thereby forming the first and second sheets into a non-compressible block solid body.

16. A method as claimed in claim 15 for assembling a reinforced non-compressible pipe support further comprising the step of applying pressure through an injector block.

17. A method as claimed in claim 15 for assembling a reinforced non-compressible pipe support wherein the flowable material is comprised of thermoplastics.

18. A method as claimed in claim 15 for assembling a reinforced non-compressible pipe support wherein the insulation of the first and second sheet is aerogel.

19. A method as claimed in claim 15 for assembling a reinforced non-compressible pipe support further comprising the step of using a honeycombed pattern of voids.

20. A method as claimed in claim 15 for assembling a reinforced non-compressible pipe support further comprising the step of flowing additional resin between the sheets around a plurality of voids.

\* \* \* \* \*